INVENTOR
Carl W. Bollum, Sr.

ATTORNEY

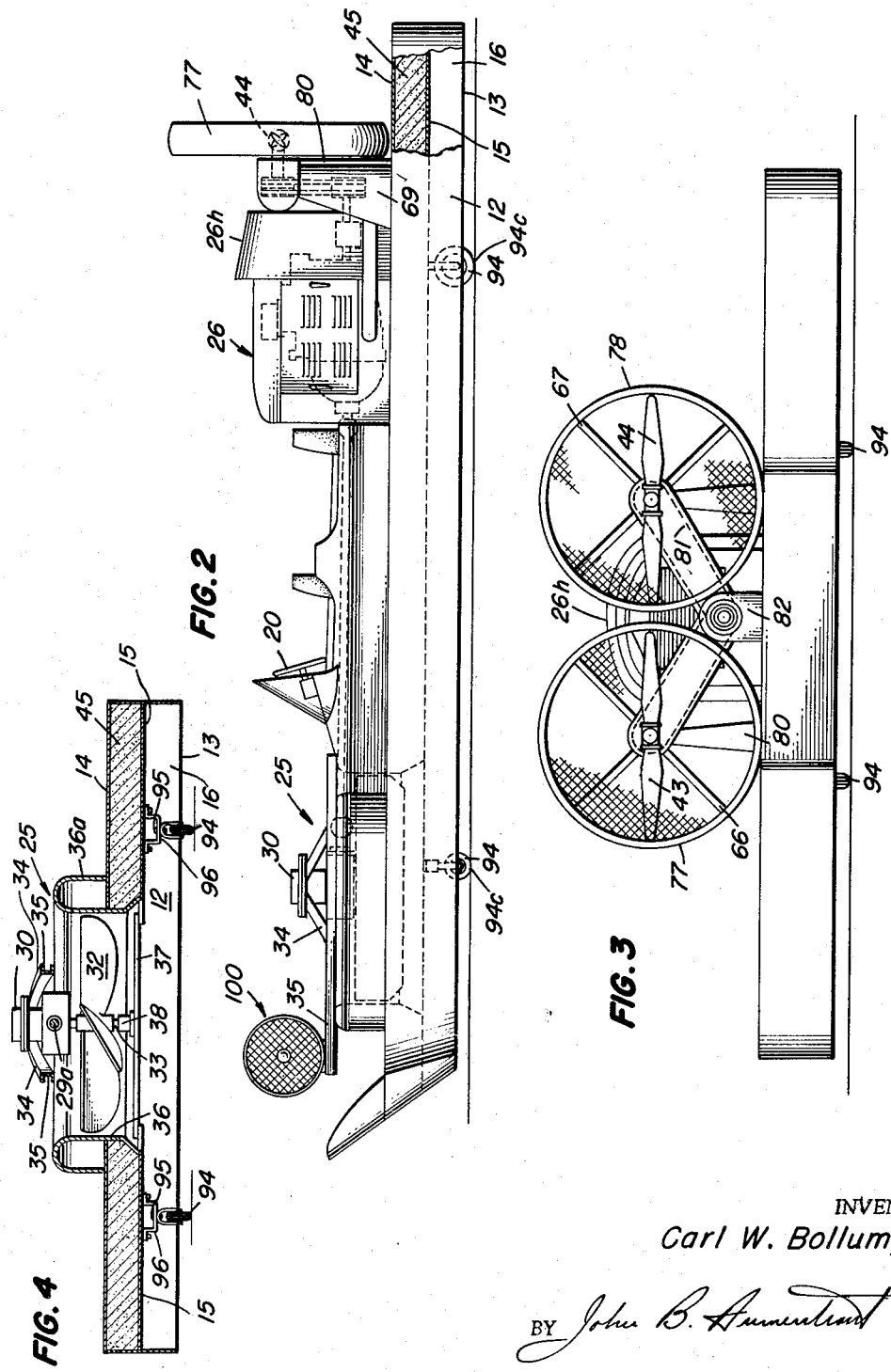

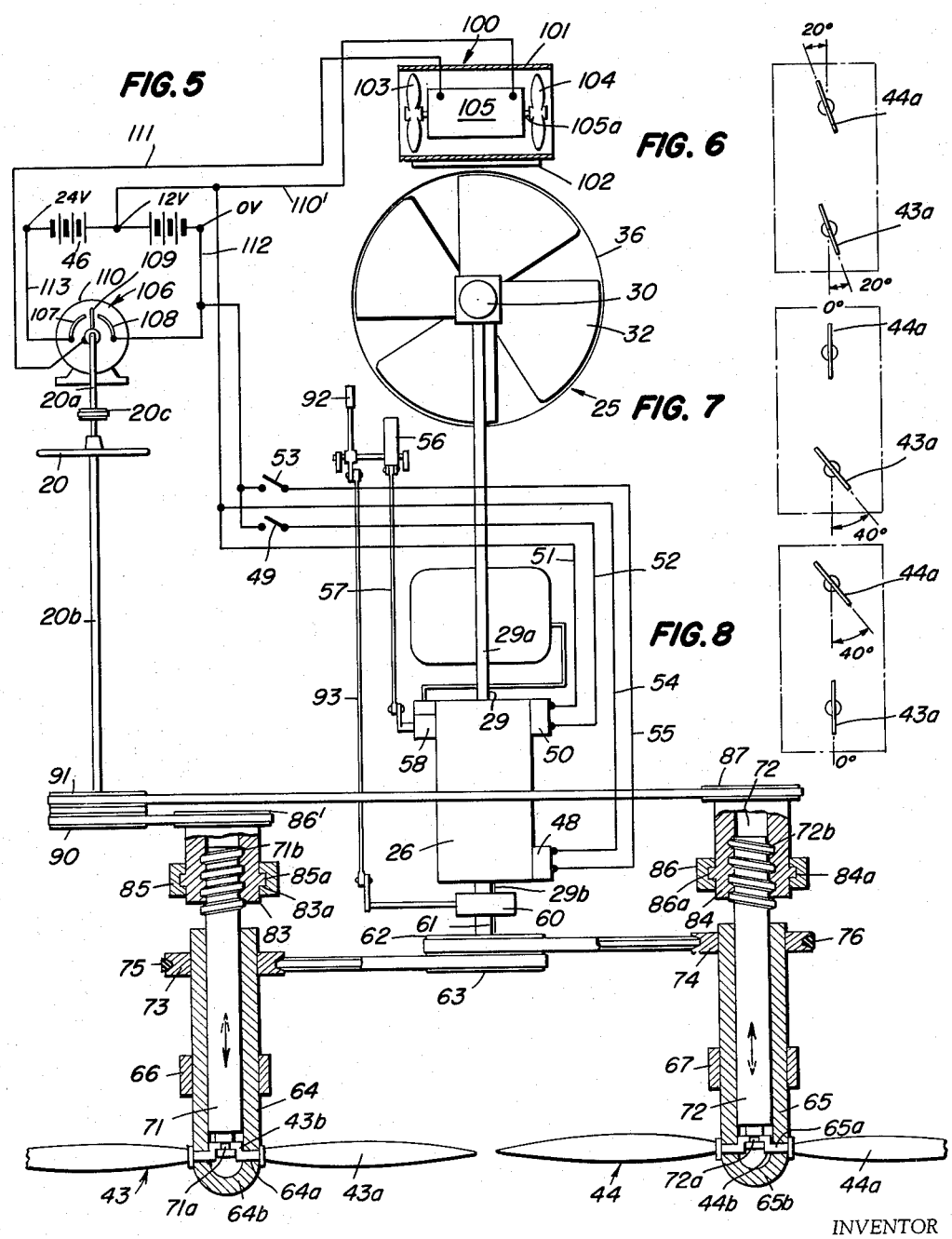

United States Patent Office 3,153,461
Patented Oct. 20, 1964

3,153,461
GROUND EFFECT VEHICLE WITH STEERING AND PROPELLING MEANS
Carl W. Bollum, Sr., Bethesda, Md., assignor, by mesne assignments, to Carwil Enterprises, Incorporated, Daytona Beach, Fla.
Filed Dec. 16, 1959, Ser. No. 859,911
3 Claims. (Cl. 180—7)

This invention relates to earth skimming air vehicles which are sustained in the air at low elevations by the pressure of a blanket of gas introduced by the vehicle itself and more particularly the invention is concerned with vehicles in this general category which are adapted to travel and be guidedly controlled while lifted by gas pressure.

An object of the present invention is to provide a vehicle which by the lifting pressure of a gas supplied to the underneath side is adapted to form a lift gap at low altitudes with a surface that is to be traveled, which vehicle displays quite worthwhile maneuverability while in the air and can effectively develop thrust for traveling in the condition of being gas pressure sustained.

Another object of this invention is the provision of a vehicle of the character indicated which has excellent transverse thrust control and is well suited to make sharp turns while in the air.

Another object is that of providing vehicles of the character indicated which are adapted to be sharply maneuvered under power while hovering in the air such as to achieve desired direction before beginning travel or after ending travel along the surface of the earth.

Other objects of the invention will be obvious and in part pointed out more fully hereinafter.

In the accompanying drawing forming a part of the specification, in which like characters of reference designate like components in the several views:

FIGURE 1 is a top plan view of a vehicle embodying my invention;

FIGURES 2 and 3 respectively are side and rear elevations of the vehicle corresponding to FIGURE 1;

FIGURE 4 is a transverse sectional elevation of the vehicle along line A—A in FIGURE 1;

FIGURE 5 is a schematic representation of components of the vehicle and controls employed for the same; and FIGURES 6, 7, and 8 are indicative of different pitch relations of the blades of variable pitch propellers in the vehicle represented in the preceding figures.

Figure 1:
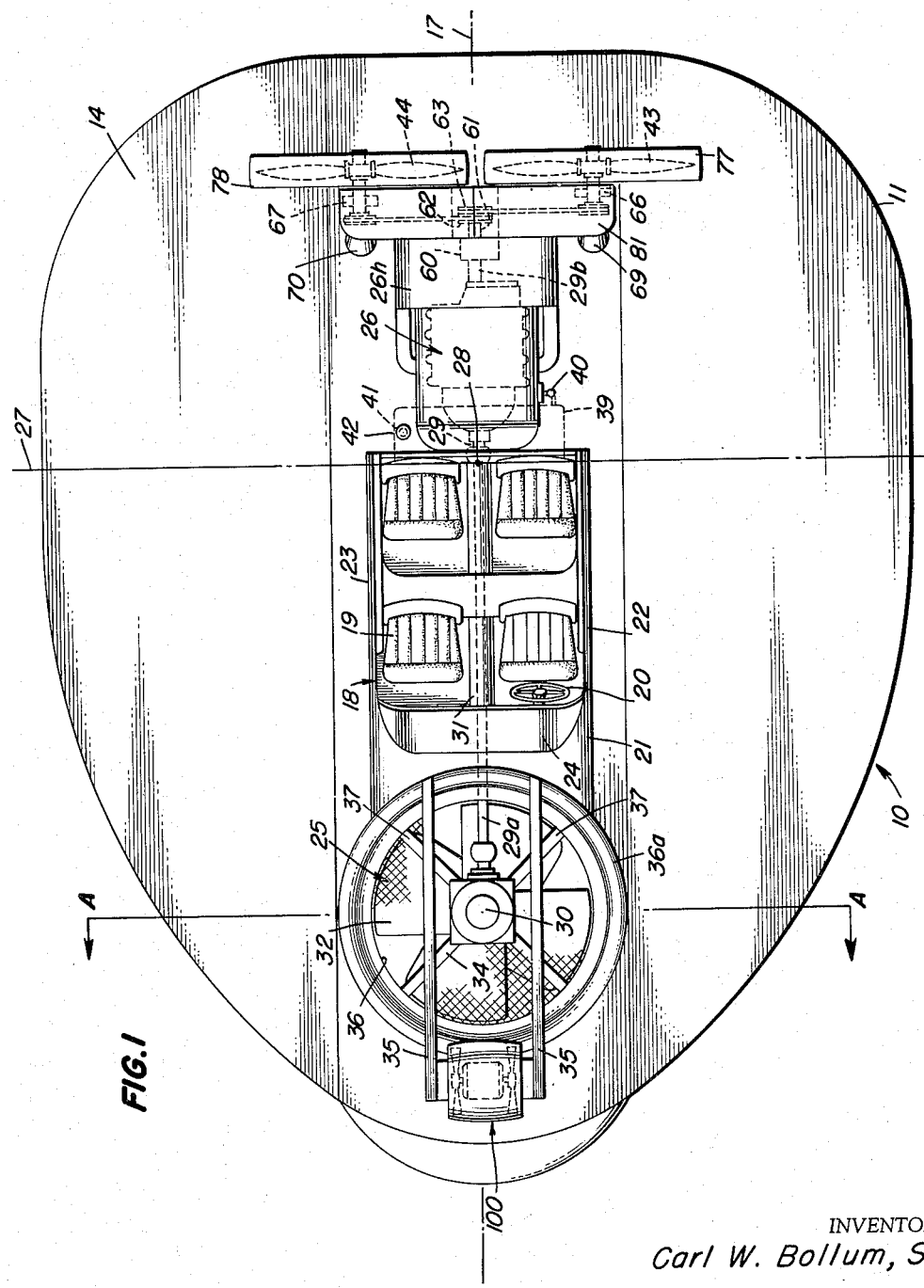

In accordance with the practice of the present invention, a hydro-air vehicle 10 is provided comprising a body which includes a platform 11 and there is a gas compression chamber 12 in the body extending down to the bottom side 13 of the body. The top side 14 of the platform conveniently serves as a deck or floor area while the under side 15 of the platform is the ceiling of the gas compression chamber 12 and accordingly affords a large area upon which gas pressure may act to lift the vehicle off the earth. Platform 11 supports adjacent to its circumferential edge a downwardly extending skirt 16 which forms the side wall of the compression chamber 12 and terminates a considerable distance below the ceiling of the compression chamber at an edge forming the bottom side 13 of the vehicle body. The bottom edge of the skirt preferably lies in a plane that is parallel to the ceiling 15 of the compression chamber and to the floor or deck 14 of the platform.

Inboard along the fore and aft center line 17 of the vehicle platform is a cockpit 18 having seats 19 to accommodate four persons. Two of the seats are on one side of the longitudinal center line of the platform and the other two seats are on the opposite side of the same center line. One of the seats is for the pilot. The vehicle has a steering wheel 20 associated with the latter seat for the pilot to control the vehicle. A housing of the cockpit includes a cowl 21, side walls 22 and 23 on opposite sides of the seats and extending rearwardly of the rearmost seats of the cockpit. Behind the seats the housing spans upper portions of the opposite side walls and forms a space with the platform above the floor of the platform. The platform floor is available inside the cockpit as cockpit floor area. A windshield 24 extends laterally of the vehicle and upward from the cowl to protect the occupants when the vehicle is traveling in a forward direction.

Means mounted on vehicle body for maintaining a gas pressure in the compression chamber to lift and support the body clear of the surface of the earth by that gas pressure, in the present instance includes an air lift pump 25 and a driving motor 26 for the pump. The pump and motor are disposed in tandem with the cockpit and are mounted in positions on the platform respectively forward and aft of the cockpit. Motor 26 and the cockpit respectively are grouped around the center of gravity 28 of the platform and are aft and forward respectively of the transverse center line 27 of the platform. The motor has its drive shaft 29 extending in a fore and aft direction approximately over the longitudinal center line of the platform.

The forward end of the drive shaft 29 of the vehicle motor has an extension drive shaft 29a connected to the input side of an L-gear box 30. The extension drive shaft passes through the housing of the cockpit rearward of the seats of the vehicle, thence through a sleeve 31 of the housing between the forward and aft pairs of seats of the cockpit, then underneath the cowl and is connected forward of the cowl into the gear box. The output shaft 33 of this gear box carries in driven relation a four blade rotor 32 of the air pump 25. The rotor shaft 33 accordingly is journaled at its upper end in the gear box and has support through the gear box being connected by struts 34 to spaced longitudinal beams 35 which are supported on the top rail 36a of a vertical throat extension of an air duct 36, the duct being through the vehicle platform. The rotor of the pump is disposed in the duct coaxially of the duct and has the lower end of the shaft 33 supported in a lower journal support 38 connected by radial extending frame members 37 in the duct and connected to the platform. Accordingly, the intake side of the air pump 25 is open to the ambient air above the platform of the vehicle and the discharge of the pump is into the compression chamber 12 of the vehicle through duct 36.

A fuel tank 39 is provided for the motor 26 and for this purpose is conveniently housed within the vehicle platform. A fuel line 40 leads from the fuel tank to the motor and also the tank has a fill pipe 41 which is covered by closure cap 42 accessible from the top side of the platform. This fuel tank preferably is in the imedmiate vicinity of the center of gravity of the platform and is disposed behind the cockpit seats and adjacent to the forward end of the motor 26 for good weight distribution and to introduce proximity of the tank to the motor thus reducing the length of fuel line needed.

The weight of the platform 11 is well distributed throughout the entire platform to promote good balance. Weight of any substantial consequence which through variance could upset the balance of the vehicle 10, advantageously is kept near the center of gravity of the platform. Variations in the passenger load in the cockpit and the weight of the cockpit itself, counting that of the seats, thus are better tolerated in the vehicle by positioning the cockpit well inboard and proximate to the center of gravity of the platform. For similar reasons, the fuel tank advantageously is installed near the center of gravity of the platform and thus need for counterbalancing is substantially avoided. Motor 26, in having its weight applied to the platform near the center of gravity of the latter, further serves to keep the center of gravity of the vehicle in the same vicinity inboard as the center of gravity of the platform, as preferred.

Platform 11 is symmetrical with respect to its fore and after center line 17 and is wider off the vicinity where weight of the vehicle is concentrated along the longitudinal center line of the platform and has a reduced width forward approaching the forward end, and a reduced width rearward approaching the aft end where the weight is less concentrated. When the vehicle platform thus is viewed in plan, there are relatively wide portions of the platform lying on opposite sides of the cockpit 18 and driving motor 26 and relatively narrow portions on opposite sides of the air pump 25 and longitudinal thrust producing means 43 and 44. The resultant or total vertical force component of the pressure of gas employed in the compression chamber for lifting the vehicle 10 acts upward in the vicinity of a line normal to the platform through the center of gravity of the vehicle.

The vehicle platform 11 in the present embodiment has a sheet metal top and bottom which are spaced and afford the deck and the ceiling of the gas compression chamber respectively. Skirt 16 may extend all the way up to the deck integral with the platform. The platform may have suitable frame work inside for strength and support of the outer shell thereof, and preferably is filled inside by a low density material 45 for additional strength and for buoying the vehicle on water, which material has its voids closed against absorbing water so that the craft may easily ascend for traveling in the air without the impairment of being waterlogged. The material may for example be resin foam, in which the voids or cells are closed, which substance will effectively provide buoyancy and exclude water by stably maintaining its closed cellular structure in the presence of water. The filling 45 achieved between the floor and under surface of the platform advantageously extends all the way to the outer periphery of the platform and eliminates space which otherwise could through leaks receive appreciable amounts of water, yet making the entire platform reliably buoyant on a body of water on which a landing has been made.

When the vehicle 10 is launched on water, the buoyant platform 11 maintains the vehicle afloat and the skirt 16 immerses all the way to the under surface 15 of the platform. Conveniently, the driving motor 26 of the vehicle may be started by the pilot from the cockpit through the use of a vehicle battery 46 (see FIGURE 5) on board and a suitable distributor 50 and starter 48 having switches in the cockpit and leads in circuit with terminals of the battery which illustratively are 12 and zero volt terminals respectively. The battery 46 also includes a 24-volt terminal for reasons which will be explained more fully hereinafter. An ignition circuit having switch 49 includes the distributor 50 and suitable leads 51 and 52 placing the distributor in circuit across the 12 and zero volt terminals of the battery. With ignition switch 49 closed, the pilot may thereafter start the motor 26 by momentarily closing starter switch 53 in circuit with leads 54 and 55, starter 48 and battery 46 across the zero and 12-volt terminals of the latter. The pilot then may throttle the drive motor by means of a throttle control 56 having suitable linkage 57 to throttle 58 of the motor, and as motor speed increases, the impeller 32 of the vehicle lift pump draws in air from the environs above the vehicle and delivers this air through duct 36 into the gas compression chamber 12. Pressure of the air exercised against the underneath surface of the platform in the chamber reaches a value which is sufficient to cause the vehicle to rise from the surface of the earth. The lift pressure of the air in pounds per square inch then exceeds the opposing gross weight of the vehicle in pounds per square inch. The vehicle 10 rises vertically until an equilibrium between these pressures is established. At equilibrium height, which for example may be anywhere from a fraction of an inch of the bottom side 13 of the vehicle from the surface of the earth up to several feet or more, depending upon such factors as gross weight of the vehicle and the available air pumping capacity, the air volume pumped into the plenum chamber and the air volume which escapes from under the lower edge of the skirt, are equal. In effect, an air blanket or cushion is formed under the vehicle 10 and as the air under pressure escapes, the air is replaced in like volume in the compression chamber by the operation of the lift pump 25, and the platform 11 and the remainder of the vehicle are stably airborne. Once this air bearing or cushion has been formed, it takes very little energy to move the vehicle over the surface of the earth.

As shown in FIGURES 1 and 5, after end 29b of the motor drive shaft is controlled by a clutch 60 so that the drive shaft can be selectively coupled and disengaged relative to a power take off shaft 61 onto which drive pulleys 62 and 63 are keyed to rotate with the shaft.

Longitudinal thrust generator means for the vehicle in accordance with the present embodiment includes twin variable pitch propellers 43 and 44 of like rating and size, such as of the pusher type, mounted on shafts 64 and 65 respectively extending in a fore and aft direction substantially horizontal to the deck surface of the platform parallel to each other and to the longitudinal center line of the vehicle platform. The two shafts 64 and 65 further occupy positions which are at equal horizontal distances from the longitudinal center line of the platform and lie on opposite sides of that center line.

Shafts 64 and 65 of the propellers are hollow tubular in form and are journaled in suitable bearing supports 66 and 67 at equal distances above the deck of the platform by means of a frame work including uprights 69 and 70. The blades 43a of propeller 43 extend radially from propeller shaft 64 and are journaled for axial rotation in bearings 64a at the hub end 64b of the propeller shaft. Inside the propeller shaft the blades have crank ends 43b which are engaged with a longitudinal slide bar 71 by resting in an annular groove 71a in the inner end of the bar.

Blades 44a of propeller 44 are likewise journaled at 65a in hub end 65b of shaft 65 and have crank ends 44b engaged in an annular groove 72a in the end of a slide rod 72 associated with the corresponding propeller shaft.

Keyed respectively to the propeller shafts 64 and 65 are V-belt pulleys 73 and 74. The pulley 73 accommodates V-belt 75 which is also drivingly engaged with pulley 63 on the power take off shaft. V-belt 76 drivingly interconnects pulley 62 on the power take off shaft with pulley 74 on the propeller shaft 65, the arrangement being such for example that both of the propellers 43 and 44 are driven in the same direction of rotation; however, other suitable drive arrangements are at times employed such as where the propellers are driven in opposed directions of rotation. Shroud rings 77 and 78 peripherally enclose the propellers and are mounted by a suitable frame work 80 to the vehicle platform. The belts 75 and 76 and pulleys 73 and 74 carrying the belts conveniently are encased in a housing 81 behind the shroud rings and the housing in turn is rigidly supported to the platform by connection to central upright 82 on the platform and to supports 66 and 67 of the propeller shaft bearings. The forward ends of slide bars 71 and 72 are equipped with right and left hand threads 71b and 72b respectively and these threads are accommodated in corresponding threaded bar driving elements 83 and 84. The driving elements occupy fixed axial positions. For this purpose element 83 is journaled for rotation in a bearing 85 which is rigidly connected with the vehicle platform in any suitable manner (not shown). The journal 85 has an annular groove 85a inside and this groove accommodates an annular lip 83a on the bar driving element 83 tolerating rotation of the latter element and preventing longitudinal axial movement thereof. A pulley 86' is drivingly connected to the bar driving element 83 and is situated to lie in coaxial relation with bar 71. Similarly the bar driving element 84 has an annular lip 84a riding in an annular groove 86a in bearing 86, the latter also being fixed to the vehicle platform in any suitable manner (not shown), and further a pulley 87 disposed in coaxial relation to bar 72 is rigidly connected to the bar adjusting element 84 so as to rotate with the same.

The shaft 20a on steering wheel 20 of the vehicle 10 has a countershaft 20b suitably mounted to the vehicle frame and carrying pulleys 90 and 91 which are driven through a suitable pulley and belt transmission 20c existing between shafts 20a and 20b, in either of opposite directions in accordance with rotation of the steering wheel in either of opposite like directions by the pilot of the vehicle. Pulleys 90 and 91 are respectively engaged with pulleys 86' and 87 on the bar driving elements 83 and 84 which are employed for adjusting the bars 71 and 72 axially. A rotation of the steering wheel 20 to the right, as viewed by the pilot in FIGURE 5, serves to adjust the pitch of the blades of the propellers 43 and 44 from a normally dead ahead driving pitch position as indicated in FIGURE 6, in which positions the thrusts of the propellers are substantially equal and capable of propelling the vehicle in a longitudinally straight forward direction. Pulleys 86' and 87 associated with the bar adjusting elements 83 and 84 are driven in the same direction of rotation in response to the turning of the vehicle steering wheel to the right by the pilot and yet the reverse threaded connections existing between these adjusting elements and the corresponding threads on the adjacent ends of the adjusting bars 72 and 71 are effective to move the bars in opposite directions and the bars accordingly apply thrust to the blades 43a and 44a in opposite directions rotating the blades in opposite directions progressively from the FIGURE 6 position, ultimately to the FIGURE 7 position. Meanswhile with motor 26 driving the propeller shafts 64 and 65 through pulleys 62 and 63, belts 75 and 76 and pulleys 73 and 74, a dominating forward thrust differential is developed by propeller 43 on the left hand side of the longitudinal center line 17 of the platform which causes the vehicle to deviate to the right. The intensity of this deviation depends upon the amount of differential selected by the pilot in adjusting the propeller blades between the FIGURE 6 position to the FIGURE 7 position. A left hand turn applied to the steering wheel 20 causes the propeller blades 43a and 44a to return to the FIGURE 6 posiiton where a substantially zero thrust differential between the longitudinal thrust producing units exists and the vehicle accordingly resumes a straight forward course. With a further turn of the vehicle steering wheel to the left, however, blades 43a and 44a of the propellers introduce an ever increasing left hand forward thrust differential and ultimately reach the position indicated in FIGURE 8. The left hand thrust differential created causes the craft to deviate to the left an amount commensurate with the intensity of the right hand dominating differential established with respect to the longitudinal center line 17 of the platform.

Under all of the thrust conditions represented in FIGURES 6, 7, and 8, the vehicle 10 is propelled forward by thrust of the propellers 43 and 44 and accordingly the vehicle will continue to travel through the air on the blanket of gas supplied to the compression chamber 12 by lift pump 25. When a destination is reached, the pilot of the vehicle may disengage the longitudinal thrust propellers 43 and 44 by suitably operating the clutch 60 as by means of lever 92 available in the cockpit and interconnected with the clutch through a suitable control linkage 93. With the motor 26 still operating under substantial throttle, the vehicle loses speed and then hovers over the surface of the earth. By reducing throttle, the vehicle will descend vertically until contact with the earth is made. In those instances where the vehicle is to descend to the ground, it is preferred to include landing gear 94 in the form of wheels suitably mounted to the vehicle frame. These wheels for example may be four in number and may be grouped in a forward pair which have swivel connections 95 to the platform 11 in suitable landing gear frame work 96 (see FIGURE 4), while a remaining aft pair of the wheels 94 may have like connections to the vehicle platform except for the swivel type connections being omitted giving axles of the aft wheels which are fixed in transverse position relative to the vehicle. All of the wheels have their lowermost surface 94c supported in a plane which lies a short distance below the lower edge 13 of the skirt or bottom side of the vehicle. While this produces a small gap with the surface of the earth after the vehicle has made a landing, the lift capabilities of the air lift pump 25 far exceed interference of this gap and accordingly the vehicle may ascend when motor 26 has been throttled sufficiently to introduce a condition where the vehicle will seek equilibrium off the earth.

A cooling hood 26h for the motor 26 advantageously is provided on the vehicle platform and is open from end to end to the propellers 43 and 44 so that air will circulate through the hood and cool the motor. The hood is made of sheet metal, is arched over the motor and flanks both sides of the latter with clearance for the air to travel through the hood from end to end.

Vehicle 10 includes gas-blast steering means in the form of a side thrust steering device 100 at the forward end of the platform 11 such as immediately in advance of the air lift pump 25. The steering device 100 includes an upper cylindrical tube 101 which is mounted on a base 102 carried by the forward ends of the parallel beams 35. Tube 101, as will be explained more fully hereinafter, is directed for discharging gas in either of opposite directions transverse to the body of the vehicle and for this purpose in the present embodiment the tube is straight having an axis which is transverse to the longitudinal axis of the platform. Mounted on the inside of the tube and situated adjacent to the opposite ends thereof are bladed impellers 103 and 104. The blades of both impellers having aiding pitches in favor of moving air in the same direction through the surrounding tube 101. Mounted between the fans in the tube is a reversible D.C. motor 105 having an armature shaft 105a carrying the bladed impellers at opposite ends in driven relation. Motor 105 is in an electrical circuit with a reversing switch 106 and with the vehicle battery 46. The reversing switch has spaced arcuate contacts 107 and 108 fixed in position relative to the vehicle such as through being mounted to the switch housing 110 and the housing connected to the vehicle body. This switch also is equipped with a rotary contact 109 intermediate the fixed contacts. The rotary contact is mounted on shaft 20a of the vehicle steering wheel 20 and rotates with that shaft when the steering wheel is turned by the pilot. A gap between the fixed arcuate contacts 107 and 108 is bisected by the movable contact 109 when the longitudinal thrust propellers 43 and 44 have their pitch adjustment brought to a straight ahead course position as represented in FIGURE 6. In steering the vehicle by variable longitudinal thrust control of the propellers 43 and 44 as hereinbefore described, and with rotation of the steering wheel to the right, this brings contact 109 into conductive relation with fixed contact 108, which for example may be of the electrical resistance type giving a variable resistor effect between the movable contact and the fixed contact. A circuit accordingly is established from 12-volt terminal of the battery 46 over lead 110' through D.C. motor 105, thence over lead 111 to the movable conact 109, along the movable contact 108, and lead 112 back to the zero-volt terminal of the battery. A rotation of the impellers 103 and 104 of the transverse steering device moves air laterally of the vehicle body to the left and this air is issued into the ambient atmosphere in a blast which produces a thrust to the right thus steering the vehicle 10 to the right. The intensity of this thrust may for example be varied by a continued rotation of the steering wheel 20 to the right by the pilot thus reducing the resistance interposed in the circuit of the fixed contact 108 progressively as the rotation to the right continues. When the steering wheel 20 is returned to dead center position, motor 105 of the transverse thrust producing device stops; however, the motor may be reversed by rotation of the steering wheel further to the left until movable contact 109 becomes conductively engaged with the fixed contact 107 of the reversing switch. Fixed contact 107 may if desired be in variable resistance relation to the movable contact whereby continued movement of the steering wheel to the left reduces the resistance in the circuit of motor 105. The circuit is established from 24-volt terminal of the battery 46, over lead 113, along fixed contact 107, movable contact 109, lead 111, through D.C. motor 105, then over lead 110′ to the 12-volt terminal of the battery. The impellers 103 and 104 of the transverse thrust producing device accordingly move air through tube 101 to the right transversely to the body of the vehicle, and this air strikes the ambient atmosphere in a blast which is accompanied by a left hand thrust applied transversely of the vehicle to the vehicle body. The vehicle accordingly heels to the left and the power of this heeling movement is increased where variable resistance is employed between the movable contact and fixed contact of the switch 106 as the steering wheel of the vehicle is moved farther to the left by the pilot. The transverse steering effect achieved through the use of the steering device 100 at times is employed exclusively for rotating the vehicle 10 in the air while the vehicle is hovering thus to bring the vehicle to a desired fore and aft direction in the air such as at the end of travel along the surfaces of the earth or prior to beginning such travel. In other instances, the transverse steering device 100 is utilized simultaneously with the differential longitudinal thrust factor introduced by varying the pitch of the two longitudinal thrust producing propellers 43 and 44, still with reliance in certain instances upon the transverse thrust producing device 100 to orient the vehicle while the vehicle is hovering. By delaying the energization of the motor 105 of the transverse steering device through removing fixed contacts 107 and 108 of the reversing switch farther in terms of rotation of the movable contact 109 from corresponding straight ahead steering position of the steering wheel 20 and its shaft 20a. The gap between these fixed contacts and the movable contact at straight ahead position may in certain instances be so great as to omit operation of the transverse thrust producing device 100 entirely, placing reliance upon the differential thrust production of the longitudinal thrust producing propellers 43 and 44 to steer the device except where abrupt turns in the air are desired, which turns are made by rotating the vehicle steering-wheel far to the right or far to the left to close the gap between contact 109 and contact 107 or contact 108. An arrangement such as just described often is provided for steering the vehicle while the vehicle is hovering.

As many possible embodiments of the invention may be made and as many changes may be made in the embodiments hereinbefore set forth, it will be distinctly understood that all matter described herein is to be interpreted as illustrative and not as a limitation.

I claim:

1. A vehicle adapted to be raised from a surface by gas pressure and travel and be steered at low altitude represented by a perimetrical gas escape gap relative to said surface, said vehicle comprising a body, said body including a platform having the area of its top side and lift area coextending substantially to the perimeter of said platform and said areas in terms of area in horizontal plan being approximately equal to each other, and a downwardly extending rigid impermeable skirt immovably fixed to said platform forming substantially a surround for said lift area contiguous to the perimeter of said platform and contiguous to the perimeter of said lift area and for downwardly open plenum space having said lift area for a ceiling, and said skirt having a bottom inside periphery, and said bottom inside periphery substantially throughout being located horizontally outwardly on the vehicle about the same distance as said perimeter of said lift area and being substantially in a plane generally parallel to said platform, and means for vertically lifting and horizontally propelling the vehicle and for the vehicle to be steered in travel and turned while hovering, said means including pressurizing means on the vehicle and communicating with said plenum space for maintaining gas under pressure in said space and in cushion under said body for lifting the vehicle upward only in the region of ground effect and supporting the vehicle into a horizontally idle hovering position above said surface with said skirt forming with said surface a perimetrical gas escape gap which gap under given load on the vehicle has magnitude varying with gas pressure then available in total from said pressurizing means for lifting the vehicle in view of amounts of said gas escaping from the plenum space to the atmosphere, horizontal twin propulsion thrust generator and variable twin-thrust steering means on the vehicle, having twin axes of thrust directed longitudinally of said body for the vehicle to horizontally propel itself and be steered and the latter said means including control means for selecting horizontal propulsion of the vehicle and hovering of the vehicle substantially idle of horizontal propulsion, and said first-mentioned means further including gas-blast thrust steering means having opposed gas openings each so fixed in position adjacent to an end of said body that said gas openings being in their respective said positions communicate with the atmosphere ambient to the vehicle on opposite sides of the vehicle and said gas-blast thrust steering means having substantially the total gas output thrust thereof transverse to the fore and aft direction of said body on output of gas through selectively either of said gas openings, for the vehicle to horizontally drive itself merely in either of opposite turning senses by thrust of gas acting transversely of said body, and said gas-blast steering means including steering control means for selecting said turning senses with respect to each other for fore and aft direction of the vehicle to be changed by thrust of gas blast at least while the vehicle is hovering.

2. A vehicle of claim 1, wherein said horizontal twin propulsion thrust generator and variable twin-thrust steering means includes twin variable pitch screw propellers, having twin axes of thrust directed longitudinally of said body for the vehicle to propel itself and be steered by twin thrusts in fore and aft thrust direction, and said gas-blast thrust steering means includes an air pump which comprises an air duct fixed in position adjacent to an end of said body and having said opposed gas openings in opposite ends thereof communicating with the atmosphere ambient to the vehicle on opposite sides of the vehicle, a reversible air impeller in said duct adapted to move air through said duct and said gas openings in selectively either of opposite directions, and a reversible motor in driving connection with said impeller for said impeller to move air through said duct and said gas openings thereof selectively in either of said opposite directions, for driving the vehicle in either of opposite turning senses by thrust of air acting transversely of said body, and said steering control means includes connection with said reversible motor for direction of operation of said motor to be selected, and accordingly a corresponding one of said turning senses, for fore and aft direction of the vehicle to be changed by thrust of air blast at least while the vehicle is hovering.

3. A vehicle adapted to be raised from a surface by gas pressure and travel and be steered at low altitude represented by a perimetrical gas escape gap relative to said surface, said vehicle comprising a body having an upwardly extending downwardly open hollow underside forming a surround and ceiling for plenum space, and means for vertically lifting and horizontally propelling the vehicle and for the vehicle to be steered in travel and turned while hovering, said means including pressurizing means on the vehicle and communicating with said plenum space for maintaining gas under pressure in said space and in cushion under said body for lifting the vehicle upward only in the region of ground effect and supporting the vehicle into a horizontally idle hovering position above said surface with said hollow underside forming with said surface a perimetrical gas escape gap which gap under given load on the vehicle has magnitude varying with gas pressure then available in total from said pressurizing means for lifting the vehicle in view of amounts of said gas escaping from said plenum space to the atmosphere, horizontal twin propulsion thrust generator and variable twin thrust first steering means on the vehicle and having twin axes of thrust directed longitudinally of said body for the vehicle to horizontally propel itself and be steered, and said first-mentioned means further including gas-blast thrust second steering means on the vehicle having opposed gas openings each so fixed in position adjacent to an end of said body that said gas openings being in their respective said positions communicate with the atmosphere ambient to the vehicle on opposite sides of the vehicle and said gas-blast thrust steering means having substantially the total gas output thrust thereof transverse to the fore and aft direction of said body on output of gas through selectively either of said gas openings, for the vehicle to horizontally drive itself in either of opposite horizontal turning senses by thrust of gas merely acting transversely to the fore and aft direction of said body, and horizontal propulsion and steering control means for horizontal propulsion of the vehicle and hovering of the vehicle substantially idle of horizontal propulsion to be selected and for steering the vehicle, the latter said means including horizontal propulsion and first steering control means connected with said horizontal propulsion and first steering means for selecting horizontal propulsion of the vehicle and hovering of the vehicle substantially idle of horizontal propulsion and for steering the vehicle while the vehicle is being horizontally propelled, and second control means connected with said second steering means for selecting said turning senses with respect to each other for fore and aft direction of the vehicle to be changed by thrust of gas blast at least while the vehicle is hovering.

References Cited in the file of this patent

UNITED STATES PATENTS

| | | |
|---|---|---|
| 1,259,753 | Laszell | Mar. 19, 1918 |
| 1,734,251 | Gallet | Nov. 5, 1929 |
| 1,842,125 | Schwarz | Jan. 19, 1932 |
| 2,014,051 | Nishi | Sept. 10, 1935 |
| 2,322,790 | Cristadoro | June 29, 1943 |
| 2,939,649 | Shaw | June 7, 1960 |

FOREIGN PATENTS

| | | |
|---|---|---|
| 219,133 | Australia | Nov. 24, 1958 |

OTHER REFERENCES

"Aviation Week"; Jan. 12, 1959; pages 74 and 75; TL501A8 (vol. 70).

"Aviation Week"; July 6, 1959; pages 115 and 116.

Navy Department: The David W. Taylor Model Basin; "Ground Cushion Research at the David Taylor Model Basin—A Brief Summary of Progress to Date"; Oct. 21, 1959.

Article appearing in Washington, D.C., "Evening Star," issue of October 9, 1959, page B-8, columns 1 and 2, entitled "Test 'Flight' Nearing for Air Borne Boat."